(12) United States Patent
Chae

(10) Patent No.: US 9,182,865 B2
(45) Date of Patent: Nov. 10, 2015

(54) TOUCH SCREEN AND TOUCH PANEL INCLUDING MUTUAL CAPACITANCE TYPE AND SELF-CAPACITANCE TYPE PIXELS, AND DRIVING METHOD THEREOF

(71) Applicant: DONGBU HITEK CO., LTD., Seoul (KR)

(72) Inventor: Jeong-Seok Chae, Seoul (KR)

(73) Assignee: Dongbu HiTek Co., Ltd., Seoul (KR)

( * ) Notice: Subject to any disclaimer, the term of this patent is extended or adjusted under 35 U.S.C. 154(b) by 32 days.

(21) Appl. No.: 14/101,268

(22) Filed: Dec. 9, 2013

(65) Prior Publication Data
US 2015/0109235 A1  Apr. 23, 2015

(30) Foreign Application Priority Data
Oct. 17, 2013 (KR) .................. 10-2013-0123768

(51) Int. Cl.
*G06F 3/045* (2006.01)
*G06F 3/044* (2006.01)

(52) U.S. Cl.
CPC ...................................... *G06F 3/044* (2013.01)

(58) Field of Classification Search
CPC ........................................................ G06F 3/044
USPC ........................................................... 345/174
See application file for complete search history.

(56) References Cited

U.S. PATENT DOCUMENTS

| 8,390,597 | B2 * | 3/2013 | Bernstein ...................... 345/174 |
| 2010/0026656 | A1 * | 2/2010 | Hotelling et al. ............. 345/174 |
| 2013/0049771 | A1 * | 2/2013 | Peng et al. .................... 324/658 |
| 2013/0181947 | A1 * | 7/2013 | Kwon et al. ................... 345/175 |
| 2014/0035871 | A1 * | 2/2014 | Karpin et al. ................. 345/174 |

* cited by examiner

*Primary Examiner* — Kwang-Su Yang
(74) *Attorney, Agent, or Firm* — Andrew D. Fortney; Central California IP Group, P.C.

(57) ABSTRACT

A touch screen, a touch panel, and a driving method thereof are provided. The touch panel recognizes a user's touch, and includes a plurality of driving lines arranged in a first direction. A plurality of sensing lines are arranged in a direction crossing the first direction. Pixels are at locations where the driving lines and the sensing lines cross each other. Some of the pixels include mutual capacitance type pixels that recognize the user's touch by mutual capacitance, and at least part of the remainder of the pixels include self-capacitance type pixels that recognize the user's touch by self-capacitance.

20 Claims, 5 Drawing Sheets

TOUCH SCREEN AND TOUCH PANEL INCLUDING MUTUAL CAPACITANCE TYPE AND SELF-CAPACITANCE TYPE PIXELS, AND DRIVING METHOD THEREOF

CROSS-REFERENCE TO RELATED APPLICATIONS

The present application claims priority under 35 U.S.C. 119 and 35 U.S.C. 365 to Korean Patent Application No. 10-2013-0123768 (filed on Oct. 17, 2013), which is hereby incorporated by reference in its entirety.

BACKGROUND

The present disclosure relates to a touch screen, a touch panel, and a method of using the same.

Typically, touch panels are used in input devices such as personal computers, laptop and tablet computers, mobile communication devices such as smart phones, and personal digital assistants (PDAs).

Recently, touch panels are used in various information processing devices because they are simple and do not malfunction frequently, and users can easily carry such information processing devices, input information and characters such as letters without use of other input devices, and easily know how to use them.

As a technology for implementing this touch panel, an array of capacitive devices is mainly used. The capacitive devices may be classified into a self-capacitance type devices and a mutual-capacitance type devices.

Firstly, self-capacitance is a technique for sensing a coordinate touched by a user by measuring a change of capacitance induced by a change in distance between a conductor and electrodes of an electrode plate that form a touch panel. Self-capacitance can sense the user's touch even when the user's touch is not directly on or over the conductor, but is in close proximity to the conductor (sometimes referred to as "proximity sensing"). However, self-capacitance sometimes has limited recognition of precise touch coordinates due to vulnerability to noise and low touch resolution.

On the contrary, mutual capacitance is a technique for recognizing the user's touch by forming an equipotential line on a conducting film that forms the touch panel, and sensing a capacitance value change in the conducting film according to the area in which the distance between the conducting film and the conductor decreases.

Mutual capacitance has a high touch resolution, but may have limited capability in proximity sensing.

Recently, as proximity sensing becomes more and more important, a method is suggested that an additional self-capacitance type pad is stacked on a mutual capacitance type touch panel. However, this method results in increases in the thickness of the touch panel and in production costs. Also, the self-capacitance type devices and the mutual capacitance devices operate separately in a single touch panel.

SUMMARY

Embodiments of the present disclosure provide a hybrid type touch panel including both self-capacitance and mutual capacitance devices.

In one or more embodiments, a touch panel recognizing a user's touch, includes a plurality of driving lines arranged in a first direction; a plurality of sensing lines arranged in a second direction crossing the first direction; and pixels at locations where the driving lines and the sensing lines cross each other, wherein some of the pixels include mutual capacitance type pixels (e.g., that recognize the user's touch by mutual capacitance), and at least part of the remainder of the pixels include self-capacitance type pixels (e.g., that recognize the user's touch by self-capacitance). In one embodiment, all of the remainder of the pixels include self-capacitance type pixels.

The details of one or more embodiments are set forth in the accompanying drawings and the description below. Other features will be apparent from the description and drawings, and from the claims.

DETAILED DESCRIPTION OF THE EMBODIMENTS

Figure 1:
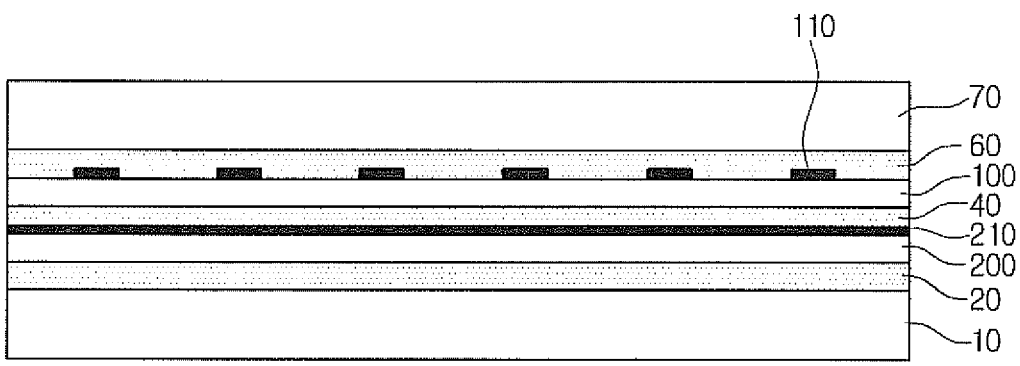
FIG. 1 is a cross-sectional view of a touch screen panel display apparatus.

Reference will now be made in detail to embodiments of the present disclosure, examples of which are illustrated in the accompanying drawings.

A touch panel according to one or more embodiments will be described in detail with reference to the accompanying drawings. The invention may, however, be embodied in many different forms and should not be construed as being limited to the embodiments set forth herein; rather, alternate embodiments included in other retrogressive inventions or falling within the spirit and scope of the present disclosure can easily be derived by adding, altering, and/or changing the disclosed embodiments. The disclosed embodiments fully convey the concept(s) of the invention to those skilled in the art.

In addition, the terms "first" and "second" can be selectively or exchangeably used for individual members of a group or plurality. In the figures, one or more dimensions of each element may be exaggerated for clarity of illustration, and may be different from the actual dimension(s) of the element(s). Not all elements illustrated in the drawings are required or limit the present disclosure; rather, the disclosed elements other than essential features of the present disclosure may be added or deleted. Also, in the descriptions of various embodiments, when a layer (or film), a region, a pattern, or a structure is referred to as being "on/above/over/upon" a substrate or another layer (or film), region, pad, or pattern, it can be directly on the substrate, other layer (or film), the region, the pad, or the pattern, or one or more intervening layers may also be present. Further, when a layer (or film), a region, a pattern, or a structure is referred to as being "under/below" another layer (film), region, pattern, or structure, it can be directly under the other layer (film), region, pad, pattern, or structure, or one or more intervening layers may also be present. The terms "upper" and "lower" (and grammatical variations thereof) refer to a position or location of a corresponding layer (film), region, pad, pattern, or structure relative to another layer (film), region, pad, pattern, or structure. Therefore, meanings thereof may be judged according to the spirit of the present disclosure.

Embodiments of the present disclosure pertain to a hybrid touch panel including both self-capacitance type and the mutual capacitance type devices.

In some embodiments, a method is described of implementing a hybrid touch panel, in which a self-capacitance type device is added to a mutual capacitance touch panel including two layers (e.g., within the same two electrically active layers). However, the spirit and/or concept(s) of the present disclosure can also be applied to a touch panel including a single layer (e.g., in which the capacitive devices include side-by-side or horizontally arranged electrodes).

Figure 2:
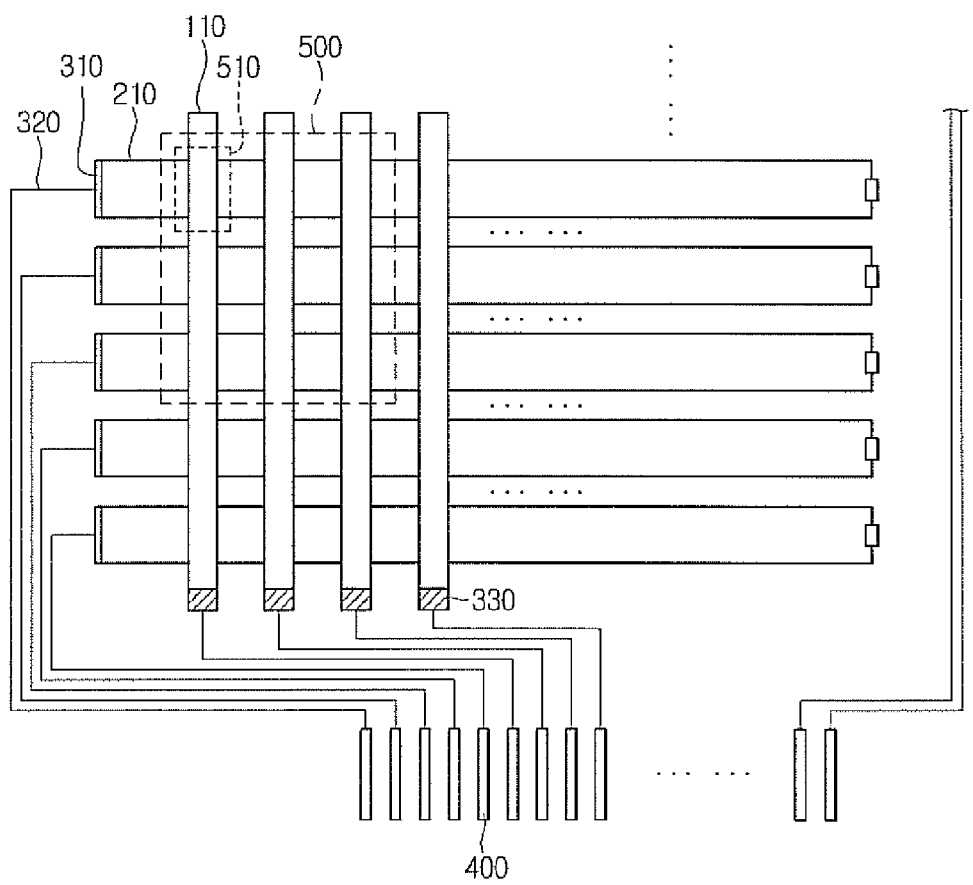
FIG. 2 is a plan view of a typical touch panel.

FIG. 1 is a cross-sectional view illustrating a touch screen panel display apparatus, and FIG. 2 is a plan view illustrating a typical mutual capacitance type touch panel.

The touch screen panel display apparatus shown in FIG. 1 is a glass-film-film (GFF) type. The touch screen panel display apparatus includes a display 10, an indium tin oxide (ITO) film 200 on a top portion of the display 10, a perpendicular ITO film 100 on a top portion of the X-axis ITO film 200, and a window glass 70 on the ITO film 100. Also, optical clear adhesives (OCAs) 20, 40, and 60 are respectively between the display 10 and the ITO film 100, between the ITO film 200 and the ITO film 100, and between the ITO film 100 and the window glass 70. A first touch sensor pattern 210 (e.g., along an X-axis) is on the ITO film 200, and a second touch sensor pattern 110 (e.g., along a Y-axis) is on the ITO film 100.

Embodiments of the present disclosure may be also applied to a glass-glass (GG) type touch screen panel which allows a metal pattern to be formed more easily on an ITO film, compared to a touch screen panel having the above-described structure.

In this touch screen panel, the ITO film 200, the first touch sensor pattern 210, the ITO film 100 and the second touch sensor pattern 110 are considered to form a touch panel. That is, since the first pattern 210 and the second pattern 110 are mutually oriented in different layers, the touch panel may have a grid or matrix structure.

Hereinafter, for the sake of convenience, the first pattern 210 are considered driving lines, and the second pattern 110 are considered sensing lines.

The touch panel is described in detail in relation to FIG. 2. The typical mutual capacitance type touch panel is configured to include the driving lines 210 and the sensing lines 110 in a grid or a matrix, in order to represent coordinates.

Contact units 310 are respectively formed at one end of each of the driving lines 210, and the contact units 310 are connected to a driving unit (not shown) through respective trace lines 320 and ports 400 connected to the trace lines 320.

The driving unit drives the touch panel by applying a periodic signal (e.g., from a reference clock) to each of the driving lines 210 to capacitively couple the driving lines 210 and the sensing lines 110.

The driving lines 210 are spaced apart by a predetermined interval along the X-axis, and the sensing lines 110 are spaced apart by a predetermined interval along the Y-axis in a different layer from the driving lines 210.

Sensing contact units 330 are at one end of each of the sensing lines 110, and each of the sensing contact units 330 is connected to a sensing unit (not shown) by trace lines similar to trace lines 320 and ports (similar to the ports 400) connected to the trace lines.

The sensing unit senses a change in capacitance resulting from a user's touch. The sensing unit according to various embodiments may sense a capacitance change by measuring an amount and/or change of charge transferred by the sensing lines 110.

In detail, when there is no user touch, the mutual capacitance may be represented as the sum of the amounts of parasitic charge at points where the driving lines 210 and the sensing lines 110 meet in parallel and the amounts of charge at other points where the driving lines 210 and the sensing lines 110 do not meet in parallel.

When the user touches the panel, charges at the points where the driving lines 210 and the sensing lines 110 do not meet in parallel may be coupled by the user's touch and transferred to a ground potential so that the mutual capacitance may change (more accurately, may decrease).

Sensing touch coordinates of the user by sensing the mutual capacitance change may be known as mutual capacitance.

On the contrary, self-capacitance is generated between the sensing lines 110 and the user. That is, when the user touches the window glass 70 in a particular location over the sensing lines 110, a technique that measures capacitance induced between the sensing lines 110 and the user and recognizes the touch coordinates may be known as self-capacitance.

In self-capacitance, when a grounded user accesses or is capacitively coupled to certain sensing lines 110, additional charge flow to the user through the coupled sensing lines 110 and the self-capacitance may increase. Self-capacitance measures the self-capacitance and senses touch coordinates of the user.

Furthermore, in FIG. 2, since each of the pixels 510 at which a sensing line 110 and a driving line 310 cross has mutual capacitance, the sensing unit may scan all touch coordinates for each pixel having a changed capacitance in the mutual capacitance type touch panel.

In the disclosed embodiments, a touch panel implementing the two capacitance types together may be provided by forming some of the pixels 510 as mutual capacitance type pixels, and at least some of the remainder of the pixels 510 as self-capacitance type pixels. In one embodiment, all of the remainder of the pixels 510 are self-capacitance type pixels.

Hereinafter, a hybrid touch panel is described that scans touch coordinates for some pixels in a group 500 using mutual capacitance and for the remainder of the pixels in the group 500 using self-capacitance.

Figure 3:
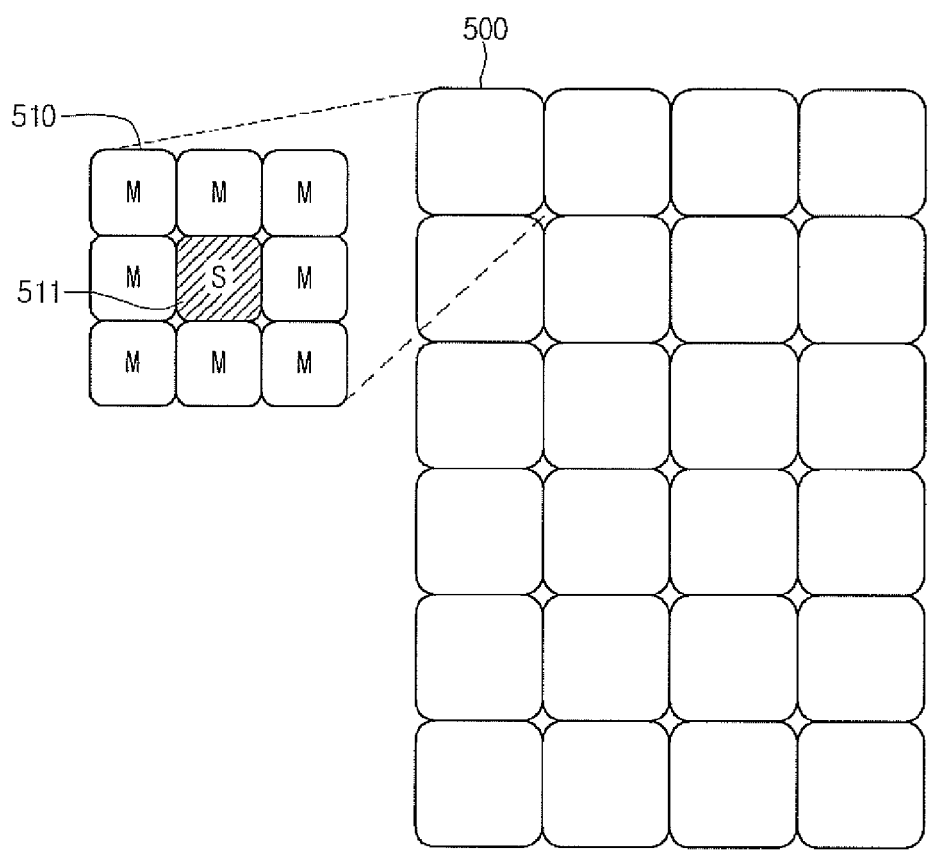
FIG. 3 schematically illustrates a plane of a touch panel according to one or more embodiments of the present disclosure.

FIG. 3 schematically illustrates a plane of a touch panel according to embodiments of the present disclosure.

Referring to FIG. 3, the touch panel according to one or more embodiments comprises a plurality of groups 500, each including a plurality of pixels 510. In general, the plurality of groups 500 is arranged in an x-by-y array, where each of x and y is independently an integer of at least 2 (e.g., 3, 4, 5, 10, 20, 100, etc.), and the plurality of pixels 510 is arranged in an m-by-n array, where each of m and n is independently an integer of at least 2 (e.g., 3, 4, 5, etc.).

In the embodiments, nine pixels 510 adjacent to each other (e.g., in a 3-by-3 array) are designated as one group, but it is possible to group n pixels 510 in various ways. For example, the pixels 510 may be in a 2-by-2 array, a 2-by-3 array, a 3-by-4 array, a 4-by-4 array, etc. Furthermore, up to 50% of the pixels 510 in a group 550 may be in which 1 or 2 pixels may be self-capacitance type pixels, and the self-capacitance type pixels may be in any location in the group, but in general, the self-capacitance type pixels are spaced apart so that no two self-capacitance type pixels are adjacent to each other.

In addition, adjacent groups 500 do not necessarily contain identical arrangements of pixels, although they generally contain the same numbers of rows and columns in the array. For example, a first group 500 may contain the 3-by-3 arrangement shown with a center self-capacitance type pixel, and the adjacent groups above, below, and to the right and left of the first group 500 may contain a 3-by-3 arrangement with two self-capacitance type pixels in opposed corners (e.g., if one self-capacitance type pixel is in the upper right corner, the other pixel is in the lower left corner). A nearly infinite number of examples can be easily imagined by one skilled in the art.

Referring to the drawing in which the group 500 is enlarged, the group 500 includes eight mutual capacitance type pixels M in which a touch coordinate is sensed by mutual capacitance, and one self-capacitance type pixel S in which a touch coordinate is sensed by self-capacitance. That is, the user's touch is recognized by self-capacitance in the self-capacitance type pixel S at the center of the group 500, and the user's touch is recognized by mutual capacitance in the eight mutual capacitance type pixels M surrounding the self-capacitance type pixel S.

As discussed above, it is also possible to form a hybrid touch panel by arranging the self-capacitance type pixel S and the mutual pixels M in various ways, besides the embodiment shown in FIG. 3.

Hereinafter, a method of implementing pixels 510 as self-capacitance type pixels S and mutual capacitance type pixels M is described.

The typical mutual capacitance type touch panel shown in FIG. 2 includes the sensing lines 110 having a narrow width in order to precisely observe a mutual capacitance change during a user's touch. Since these sensing lines 110 having a narrow width result in pixels having an area in which a human finger overlaps the sensing lines 110, resulting in an induced capacitance change between adjacent lines 110 that is very small, it is difficult to implement the self-capacitance type pixel S in such an array.

Figure 4:
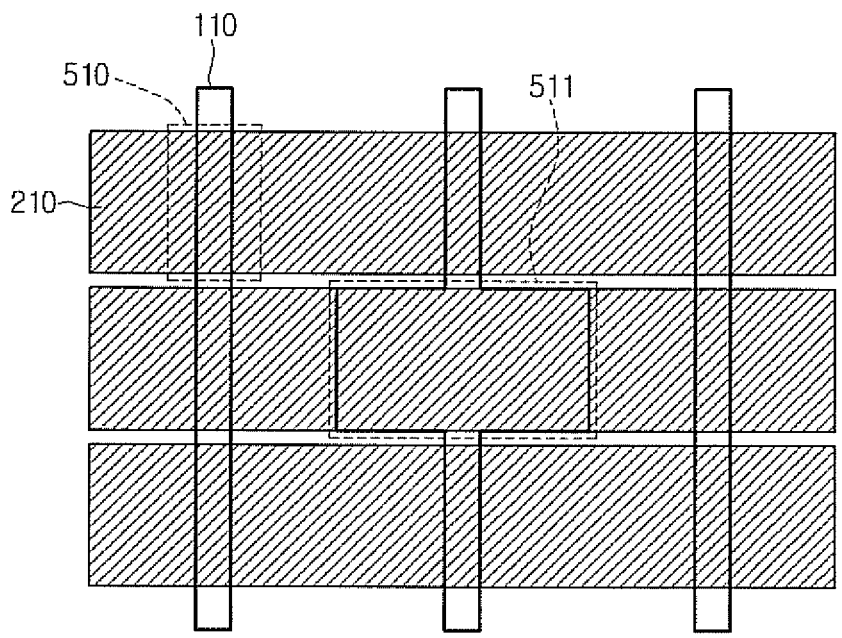
FIG. 4 is a plan view illustrating a group of pixels forming a touch panel unit according to one or more embodiments of the present disclosure.

FIG. 4 is a plan view illustrating a group of pixels, a plurality or array of which form the touch panel, according to one or more embodiments of the disclosure.

Referring to FIG. 4, the group 500 includes a self-capacitance type pixel S having a greater width in a region or area of the -capacitance type pixel 511.

In detail, when the array of pixels is organized as a row and a column (the X axis and Y axis, respectively), the width of the sensing line 100 in the second row and second column of the group 500 is increased to form the self-capacitance type pixel 511, and widths of the remainder of the sensing lines 110 are kept constant and/or narrow to form the mutual capacitance type pixels M.

Since the width of the sensing line 110 is increased so that a surface area of the sensing line 110 capable of being touched by the user increases, the self-capacitance inducible between the sensing line in pixel 511 and the user may also increase. Namely, the self-capacitance type pixel 511 may be formed by increasing the width of the sensing line 110 in the area of the self-capacitance type pixel 511, thereby increasing the amount of change in the self-capacitance generated when the user's finger is in the proximity of the widened sensing line 110 in the self-capacitance type pixel 511.

However, when the width of the sensing line 110 is increased, the mutual capacitance between the sensing line and the driving line 210 in the self-capacitance type pixel 511 becomes very large.

When the mutual capacitance value of the self-capacitance type pixel 511 becomes large, the maximum value of the driving signal is determined by the self-capacitance type pixel S, and sensing signals of the mutual capacitance type pixels M are relatively small. Therefore, coordinate scanning may not be as accurate as desired.

Figure 5:
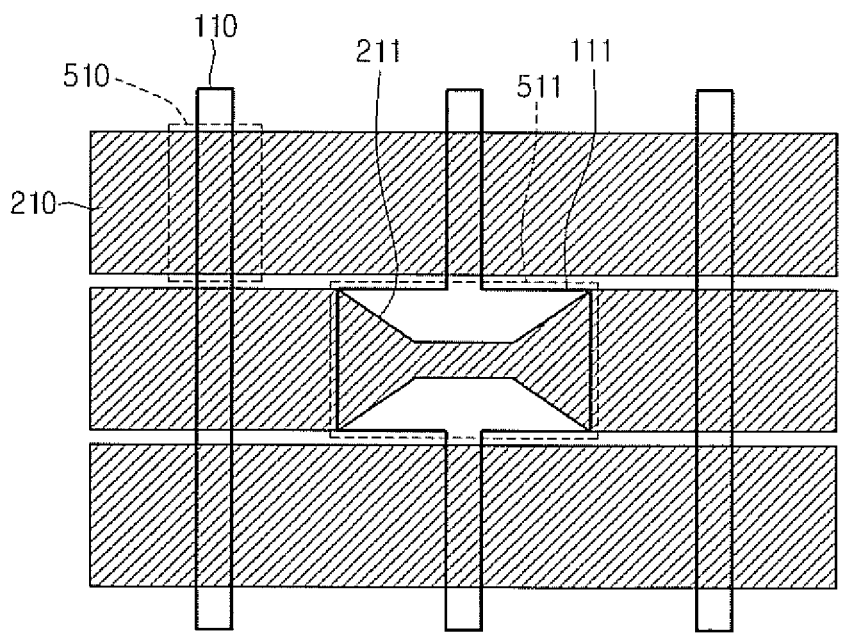
FIG. 5 is a plan view illustrating a group of pixels in which a driving line pattern is changed according to an embodiment of the present disclosure.

FIG. 5 is a plan view illustrating a group of pixels in which the driving line pattern is changed according to an embodiment of the disclosure. Referring to FIG. 5, a pattern of the driving line 211 below the widened sensing line 111 is changed. In detail, the self-capacitance type pixel 511 has the changed pattern of the driving line 211.

That is, when an area of the driving line 211 in the self-capacitance type pixel 511 is reduced, the area of the driving line 211 crossing under the sensing line 111 decreases, and the mutual capacitance value thereof can be reduced.

In various embodiments, the surface area may be reduced by linearly reducing the width of the driving line 211 in a first region, keeping it constant in a second region, and then linearly increasing it again (e.g., back to the original width) in a third region. However, besides the embodiment shown in FIG. 5, the driving line 211 may have any of various shapes that reduce the area that crosses under the sensing line 111. For example, a stepwise decrease in the width of the driving line 211, in which the width of the driving line 211 in the region goes from a first, relatively high value to a second, relatively low value, may be effective. A decrease in width of from 10% to 90%, or any value or range of values therein, is effective in substantially all such embodiments.

As a result of the reduced overlap area in the self-capacitance type pixel 511, the value of the mutual capacitance between the driving line 211 and the sensing line 111 in the self-capacitance type pixel 511 decreases. That is, when the area of overlap between the driving line 211 and the sensing line 111 in the self-capacitance type pixel 511 decreases, the self-capacitance type pixel 511 has a mutual capacitance value similar to that of the mutual capacitance type pixel M.

In this configuration, the self-capacitance type pixel 511 has a mutual capacitance value similar to that of the mutual capacitance type pixel M, while having the increased self-capacitance value.

Figure 6:
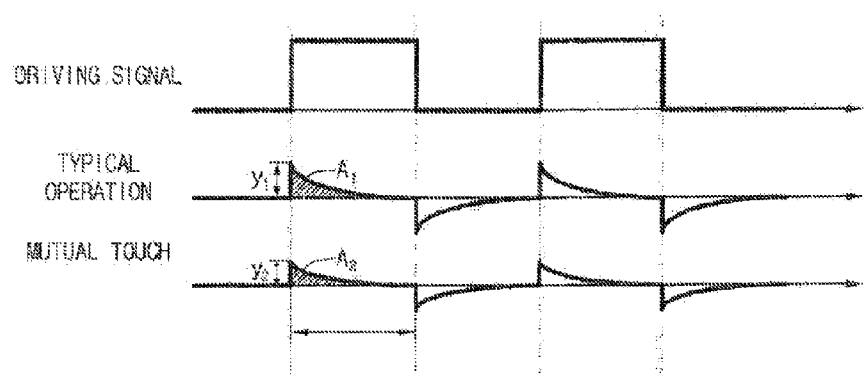
FIG. 6 shows graphs illustrating charge amounts sensed when a user touches or does not touch a mutual capacitance type touch panel according to embodiments of the present disclosure.
Figure 7:
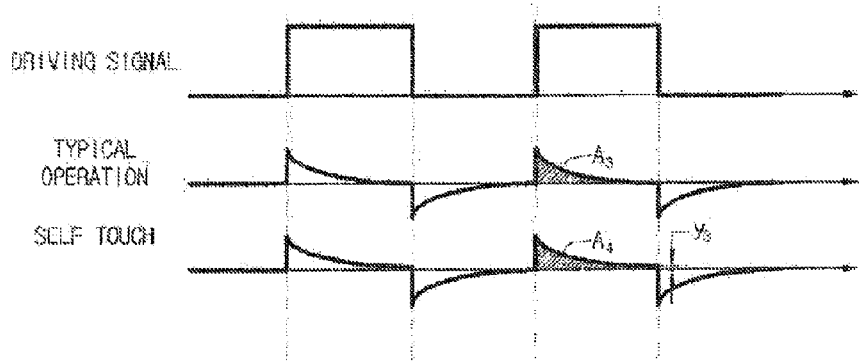
FIG. 7 shows graphs illustrating charge amounts sensed when a user touches or does not touch a self-capacitance type touch panel according to embodiments of the present disclosure.

Typical operations and changed operations during the user's touch of the self-capacitance type pixel 511 and the mutual capacitance type pixels M having the above-described configuration are described in relation to FIGS. 6 and 7.

FIG. 6 shows graphs illustrating charge amounts measured by mutual capacitance in the sensing unit when the user touches or does not touch the touch panel.

FIG. 7 shows graphs illustrating charge amounts measured by self-capacitance in the sensing unit when the user touches or does not touch the touch panel.

FIG. 6 illustrates an operation of the mutual capacitance type pixel M, and sequentially illustrates a driving signal from the driving unit to the mutual capacitance type pixel M through the driving line 210, the charge input to the sensing unit by the sensing line 110 of the mutual capacitance type pixel M when the user does not touch the touch panel, and the charge input to the sensing unit by the sensing line 110 when the user touches the touch panel.

As described above, the driving unit inputs a driving signal to each driving line 210 at a predetermined time interval.

In various embodiments, although a pulse signal of a predetermined frequency is used as the driving signal, a high frequency signal, an AC signal, or a DC signal may be also used as the driving signal, and this signal is not particularly limited as long as it is a signal capable of driving the driving lines 210.

When the pulse signal of predetermined frequency is input to the driving line 210 of the mutual capacitance type pixel M, the sensing line 110 of the mutual capacitance type pixel M is capacitively coupled to the driving line 210, and a predetermined or expected amount of charge is transferred to the sensing unit.

In detail, when the user does not touch the touch panel, a charge value having a predetermined amplitude Y1 that is exponentially reduced according to the period of the driving signal is transferred to the sensing unit, and the sensing unit integrates this value to calculate the charge amount A1.

However, at the time the user touches the touch panel, the amount of mutual capacitance decreases, and the charge amount capacitively coupled to the sensing line(s) 110 also decreases. That is, a sensing signal having a smaller amplitude Y2 than the predetermined amplitude Y1 is transferred to the sensing unit due to the user's touch, and the charge amount A2 integrated by the sensing unit decreases.

When the charge amount A2 reduced as described above is smaller than a preset reference value Aref1, the mutual capacitance type pixel M is determined as being touched by the user, and a position of the mutual capacitance type pixel M is calculated or determined as a touch coordinate. The reference value Aref1 is smaller than the charge amount A1 calculated by the sensing unit when the user does not touch the touch panel.

On the contrary, FIG. 7 shows graphs illustrating an operation of the self-capacitance type pixel S/511 and sequentially illustrates a driving signal from the driving unit to the self-capacitance type pixel S/511, the charge input to the sensing unit from the sensing line 110 of the self-capacitance type pixel S/511 when the user does not touch the touch panel, and the charge input to the sensing unit from the sensing line 110 of the self-capacitance type pixel S/511 when the user touches the touch panel.

A pulse signal of a predetermined frequency is input to the driving line 211 of the self-capacitance type pixel S/511, the sensing line 111 of the self-capacitance type pixel S/511 is capacitively coupled to the driving line 211, and a predetermined or expected amount of charges are transferred to the sensing unit. That is, when the user does not touch the touch panel, a charge value (a sensing signal) having a predetermined amplitude and exponentially decreasing according to the period of the driving signal is transferred to the sensing unit, and the sensing unit integrates this value to calculate or determine the charge amount A3.

However, when the user touches the touch panel in the proximity of the self-capacitance type pixel S, as described above, the self-capacitance increases, and the transfer time of the sensing signal is delayed. Therefore, charge coupled within the driving time (e.g., the time during which the driving signal is applied to the driving lines 210) are not entirely transferred to the sensing unit, and some charge Y3 remains on the sensing line 111. Accordingly, the charge amount A4 integrated by the sensing unit also decreases.

In detail, since a time constant of the sensing signal, which exponentially decreases, is proportional to the self-capacitance, the time constant also increases according to the self-capacitance value which increases along with or during the user's touch.

Due to the increase in the time constant of the sensing signal, the charges that is capacitively coupled to the sensing line 111 is not entirely transferred to the sensing unit within the driving time, and some charge Y3 remains on the sensing line 111.

Therefore, when the decreased charge amount A4, measured when the user touches the touch panel, is smaller than a preset reference value Aref2, a position of the self-capacitance type pixel S may be calculated or determined as a touch coordinate. The reference value Aref2 may be smaller than the charge amount A3 calculated by the sensing unit when the user does not touch the tough panel.

When areas of the sensing line 110 and/or the driving line 210 are modified or designed so that the charge amounts A1 and A2 integrated respectively when the user touches or does not touch the mutual capacitance type pixel M have values similar to the charge amounts A3 and A4, integrated respectively when the user touches or does not touch the self-capacitance type pixel S, the sensing unit may sense the touch coordinates using a single reference value (e.g., Aref1=Aref2=Aref).

Therefore, since the touch panel of the above described embodiments can recognize the touch coordinates of a user by applying self-capacitance and mutual capacitance together in a common layer or layers of the array, the touch panel has a high touch resolution, is robust to noise, and has proximity sensing.

A touch panel according to one or more embodiments can scan coordinates touched by a user by simultaneously using the mutual capacitance and the self-capacitance. Accordingly, the present touch panel has a high touch resolution, is robust to noise, and enables proximity sensing.

In addition, since the present touch panel can simultaneously drive mutual capacitance type and the self-capacitance type devices, the number of frames in which the touch coordinates can be scanned for each second can increase.

Any reference in this specification to "one embodiment," "an embodiment," "example embodiment," etc., means that a particular feature, structure, or characteristic described in connection with the embodiment is included in at least one embodiment of the invention. The appearance of such phrases in various places in the specification is not necessarily referring to the same embodiment. Further, when a particular feature, structure, or characteristic is described in connection with any embodiment, it is within the purview of one skilled in the art to affect such feature, structure, or characteristic in connection with other embodiments.

Although embodiments have been described with reference to a number of illustrative embodiments thereof, numerous other modifications and embodiments can be devised by those skilled in the art that will fall within the spirit and scope of the principles of this disclosure. More particularly, variations and modifications are possible in the component parts and/or arrangements of the embodiments within the scope of the disclosure, the drawings and the appended claims. In addition to variations and modifications in the component parts and/or arrangements, alternative uses will also be apparent to those skilled in the art.

What is claimed is:

1. A touch panel, comprising:
a plurality of driving lines arranged in a first direction;
a plurality of sensing lines arranged in a second direction crossing the first direction; and
pixels at locations where the driving lines and the sensing lines cross each other,
wherein some of the pixels comprise mutual capacitance type pixels that recognize a user's touch by mutual capacitance, at least part of the remainder of the pixels comprise self-capacitance type pixels that recognize a user's touch by self-capacitance, and a width of the driving lines forming the self-capacitance type pixels decreases from a first value to a second value in a first region, has the second value in a second region, and increases from the second value to a third value in a third region, the third value being equal to or different from the first value.

2. The touch panel of claim 1, wherein a width of the sensing lines forming the self-capacitance type pixels is greater than that of the sensing lines forming the mutual capacitance type pixels.

3. The touch panel of claim 2, wherein a width of the driving lines forming the self-capacitance type pixels is less than that of the driving lines forming the mutual capacitance type pixels.

4. The touch panel of claim 3, wherein an area of the self-capacitance type pixels is identical to that of the mutual capacitance type pixels.

5. The touch panel of claim 1, wherein an area of the self-capacitance type pixels is identical to that of the mutual capacitance type pixels.

6. The touch panel of claim 1, wherein the width of the driving lines forming the self-capacitance type pixels is less than that of the driving lines forming the mutual capacitance type pixels.

7. The touch panel of claim 1, wherein all of the remainder of the pixels are self-capacitance type pixels.

8. The touch panel of claim 1, further comprising a driving unit connected to the driving lines, configured to apply a driving signal to the driving lines.

9. The touch panel of claim 8, further comprising a sensing unit connected to the sensing lines, configured to measure a sensing signal from the sensing lines.

10. A touch screen comprising:
a display unit configured to display an image; and
a touch panel on or over a top portion or uppermost surface of the display unit, configured to recognize a user's touch,
wherein the touch panel comprises a plurality of driving lines in a first direction, a plurality of sensing lines in a second direction crossing the first direction, and pixels at locations where the driving lines and the sensing lines cross each other, wherein some of the pixels comprise mutual capacitance type pixels that recognize a user's touch by mutual capacitance, at least part of the remainder of the pixels comprise self-capacitance type pixels that recognize a user's touch by self-capacitance, and a width of the driving lines forming the self-capacitance type pixels decreases from a first value to a second value in a first region, has the second value in a second region, and increases from the second value to a third value in a third region, the third value being equal to or different from the first value.

11. The touch screen of claim 10, wherein the entire remainder of the pixels are self-capacitance type pixels.

12. The touch screen of claim 10, wherein a width of the sensing lines forming the self-capacitance type pixels is greater than that of the sensing lines forming the mutual capacitance type pixels.

13. The touch screen of claim 12, wherein the width of the driving lines forming the self-capacitance type pixels is less than that of the driving lines forming the mutual capacitance type pixels.

14. The touch screen of claim 13, wherein an area of the self-capacitance type pixels is identical to that of the mutual capacitance type pixels.

15. A method of recognizing when a user touches a touch panel, comprising:
inputting, from a driving unit, a driving signal to driving lines in the touch panel;
detecting, by a sensing unit, a sensing signal from sensing lines in the touch panel, wherein the driving lines and the sensing lines cross each other to form pixels; and
recognizing, by the sensing unit, which one or ones of the pixels output a changed sensing signal to determine a touch coordinate,
wherein some of the pixels comprise mutual capacitance type pixels that recognize a user's touch by mutual capacitance, at least part of the remainder of the pixels comprise self-capacitance type pixels that recognize a user's touch by self-capacitance, and a width of the driving lines forming the self-capacitance type pixels decreases from a first value to a second value in a first region, has the second value in a second region, and increases from the second value to a third value in a third region, the third value being equal to or different from the first value.

16. The method according to claim 15, wherein detecting the sensing signal comprises:
receiving, by the sensing unit, a charge on the sensing lines in response to the driving signal; and
integrating the charge using the sensing unit to determine a charge amount.

17. The method of claim 16, wherein the touch coordinate is determined when a charge amount from the changed sensing signal is smaller than a preset reference value.

18. The method of claim 15, wherein a width of the sensing lines forming the self-capacitance type pixels is greater than that of the sensing lines forming the mutual capacitance type pixels.

19. The method of claim 18, wherein a width of the driving lines forming the self-capacitance type pixels is less than that of the driving lines forming the mutual capacitance type pixels.

20. The method of claim 15, wherein an area of the self-capacitance type pixels is identical to that of the mutual capacitance type pixels.

* * * * *